United States Patent [19]

O'Rell et al.

[11] Patent Number: 4,812,357

[45] Date of Patent: Mar. 14, 1989

[54] PRINTING BLANKET

[75] Inventors: Dennis D. O'Rell, Boxborough; Peter M. Holleran, Concord, both of Mass.

[73] Assignee: W. R. Grace & Co.-Conn., Lexington, Mass.

[21] Appl. No.: 248,460

[22] Filed: Sep. 23, 1988

[51] Int. Cl.[4] .......................... B41N 9/00; B32B 3/26; B32B 7/02; B32B 7/04

[52] U.S. Cl. .................................... 428/246; 428/250; 428/283; 428/304.4; 428/319.3; 428/909

[58] Field of Search ............ 428/246, 250, 283, 304.4, 428/319.3, 319.7, 909

[56] References Cited

U.S. PATENT DOCUMENTS

| | | | |
|---|---|---|---|
| 3,033,709 | 5/1962 | Brown | 428/290 |
| 3,578,544 | 5/1971 | Thorsrud | 428/113 |
| 3,700,541 | 10/1972 | Shrimpton et al. | 428/313.5 |
| 3,738,948 | 6/1973 | Dunnom | 260/3 |
| 3,795,568 | 3/1974 | Rhodarmer et al. | 428/909 |
| 3,819,471 | 6/1974 | Sohnemann | 428/909 |
| 3,887,750 | 6/1976 | Duckett et al. | 428/909 |
| 4,025,685 | 5/1977 | Haren et al. | 428/248 |
| 4,174,244 | 11/1979 | Thomas et al. | 428/319.3 |
| 4,303,721 | 12/1981 | Rodriguez | 428/213 |
| 4,471,011 | 9/1984 | Spöring | 428/246 |
| 4,537,129 | 8/1985 | Heinemann | 428/909 |

*Primary Examiner*—William J. Van Balen

*Attorney, Agent, or Firm*—John Dana Hubbard; William L. Baker

[57] ABSTRACT

A printing blanket having excellent dimensional stability, compressibility and web feed properties comprising a carcass, a compressible layer overlaying the carcass, a stabilizing layer of thermoplastic reinforced elastomer overlying the compressible layer and a printing surface layer of void free rubber. The thermoplastic reinforced elastomer is.formed of fibers or fibriles of thermoplastic dispersed throughout the elastomer. Preferably the thermoplastic is molten when mixed with the elastomer in order to provide very fine, well dispersed fibriles.

13 Claims, 1 Drawing Sheet

PRINTING BLANKET

This invention relates to a resilient, compressible printing blanket and in particular to a blanket having an intermediate layer of high modulus, thermoplastic reinforced, rubber between a layer of compressible rubber and an outer printing surface.

BACKGROUND OF THE INVENTION

It is known in producing resilient, compressible printing blankets to incorporate a cellular, foamed rubber intermediate layer. U.S. Pat. No. 3,887,750 shows the use of discrete hollow fibers to obtain a closed cell foam structure while U.S. Pat. No. 3,795,568 shows the use of particles of compressible latex foam rubber to obtain closed cell rubber structures. U.S. Pat. No. 4,025,658 discloses the production of a compressible printing blanket by adding and mixing particles of hydrated magnesium sulfate in the elastomeric matrix of the layer, creating a blowing effect, and leaching the particles from the matrix to produce a compressible layer having cavities which are interconnected by passages.

Printing blankets containing the compressible foam layers provide many advantages including most importantly, resistance to smash and operating latitude. However, these blankets have been found to be dimensionally unstable in that upon compression the foam layers tend to distort and flow in any direction which ruins print quality.

The use of a fabric layer between the compressible layer and the surface printing layer gives the blanket better dimensional stability than the blankets without such a stabilizing layer. For example, U.S. Pat. No. 4,174,244 shows such a fabric layer. Blankets containing the fabric layer however, suffer from a reduction in print sharpness and a phenomenon known as "falloff at the gap".

Falloff at the gap is a reduction in the blanket thickness in the area near the edges of the gap. This is caused by the longer path the upper fabric layer must follow as it is folded over into the gap for retention on the cylinder. The fabric, which is required to travel a greater distance in conforming to the gap's surface than the underlying foam layer, cannot elongate sufficiently and thus compresses the underlying foam layer. This reduction in the blanket's thickness near the gap causes a reduction in the printing pressure applied at that location, thereby reducing the amount of ink transferred at that point. The reduction in printing pressure causes print quality to suffer at that location. Many printers do not print at that location because it is so close to the edge of the finished page, but is a major deficiency when printers are attempting to produce pages printed over their entire length.

U.S. Pat. No. 4,303,721 discloses a blanket construction which contains a hard rubber stabilizing layer between the compressible cellular layer and the printing surface layer. The hard stabilizing rubber layer made possible the elimination of a woven stabilizing layer between the compressible layer and the printing surface layer and thus eliminated the problems of reduced print sharpness and falloff at the gap. The hard rubber layer between the compressible layer and the printing surface layer was described as having to have a durometer of between 75 and 95 (Shore A). It was indicated that generally such rubbers will contain substantial amounts of inorganic fillers or carbon black and more rigid thermosetting polymers such as phenolic resins to achieve this hardness.

Printing blankets prepared according to U.S. Pat. No. 4,303,721 have shown excellent performance on sheet-fed presses with regard to print quality and register control, however, blankets prepared according to this technology have not performed as well on multiple color web presses because of poor register control (misalignment of colors) after paper splices or blanket washes. Furthermore, their performance is very sensitive to packing height. Packing height is defined as the height of the printing surface of the blanket (measured in thousandths of an inch) above the bearer height of the blanket cylinder. Blankets prepared according to U.S. Pat. No. 4,303,721 tend to exhibit poor packing latitude, i.e., must be packed to within plus/minus 0.001" of optimum height or they will result in poor register control (color movement), web wrinkles and web narrowing due to excessively high tensions between successive printing units. Blankets also exhibit the unusual property of feeding less web through the printing nip as packing heights are increased (negative web feed). By contrast, blankets which have a fabric layer above the compressible layer feed more web through the printing nip as their packing height is increased (positive web feed).

The present invention provides a compressible printing blanket having performance characteristics equal to or greater than a blanket containing a fabric but without the drawbacks of loss of print sharpnes or the phenomenon of falloff at the gap. Additionally, it provides a neutral web feed, i.e., tension on each side of the press nip is essentially equal as well as excellent packing latitude, thus overcoming the problems with blankets made in accordance with U.S. Pat. No. 4,303,721.

SUMMARY AND OBJECTS OF THE INVENTION

The present invention relates to a printing blanket having a carcass or base layer, a compressible layer, a surface printing layer and a stabilizing layer between the compressible and the surface printing layers. The stabilizing layer is comprised of an elastomer containing a thermoplastic reinforcing material.

It is one feature of this invention to provide a resilient, compressible printing blanket construction that has improved web feed properties without incorporating a fabric between the compressible layer and the printing surface layer.

It is an object of the present invention to provide a printing blanket having positioned between the printing surface layer and the cellular, resilient compressible layer, a layer of high modulus thermoplastic reinforced elastomeric composition wherein the weight ratio of elastomer to thermoplastic polymer is from about 90:10 to about 10:90 and wherein the thermoplastic polymer has a high tensile modulus value.

It is a further object of this invention to provide a thermoplastic reinforced, elastomeric stabilizing layer, wherein said thermoplastic reinforcing material is in a fibrillar form.

It is a further object of this invention to provide a thermoplastic reinforced elastomeric stabilizing layer having a tensile modulus greater than 1000 psi at 25 percent elongation.

It is a further object of this invention to provide a compressible, resilient printing blanket containing a thermoplastic reinforced elastomeric layer between the compressible rubber layer and the surface print layer wherein said blanket has web feed properties similar to those blankets having a fabric between the compressible layer and the surface printing layer.

Another object of the present invention is to provide a compressible printing blanket having good web feed properties but does not exhibit a deficiency known as "falloff at the gap".

These and other objects of the present invention will be made clear in the specifications, drawings and appended claims.

DESCRIPTION OF THE PREFERRED EMBODIMENTS

Figure 1:
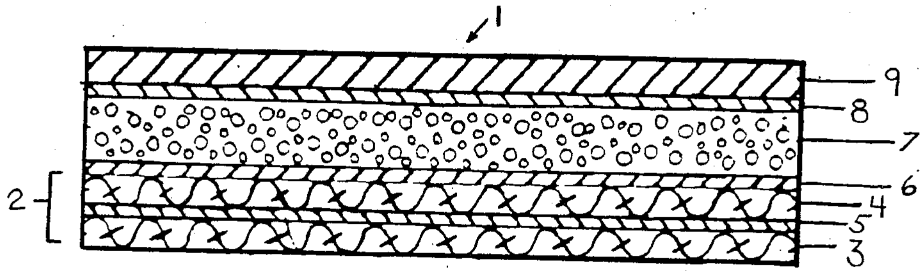
FIG. 1 is an enlarged sectional view of a compressible printing blanket incorporating the present invention with the components labeled.

Referring to FIG. 1, the resilient, compressible printing blanket 1 corresponding to a preferred embodiment of the invention may be seen to have a carcass layer 2 comprised of at least two layers of woven textile 3 and 4 laminated together with an adhesive 5. On top of the carcass layer 4 is a resilient, compressible cellular rubber layer 7. The compressible layer 7 is preferably bonded to the carcass by an adhesive layer 6. Above the compressible layer 7 is a high modulus thermoplastic reinforced elastomeric stabilizing layer 8. The high modulus, thermoplastic reinforced elastomeric layer 8 is overlaid by a printing surface layer 9.

The carcass layer 2 may consist of one layer or two or more layers of fabric bonded together. Preferably, it contains a first fabric layer 3 and a second fabric layer 4 both formed of a conventional woven fabric having low elongation characteristics in the machine (warp) direction. Suitable fabrics can be made from natural materials such as cotton, linen, hemp or jute, or man-made fibers based on natural organic polymers such as rayon, acetate or triacetate or synthetic materials such as acrylics, aramides, polyesters, polyamides, polyolefins, vinyls, glass, or based on metals or mixtures of natural, synthetic or metallic fibers. The selected weave can be any conventionally used in printing blankets such as plain, duck, twill or drill so long as it provides the desired low elongation characteristics in the machine direction. Each of the fabric layers, 3 and 4, are preferably formed of woven cotton fabric of a thickness from about 10 mils to about 25 mils, preferably about 14 to 16 mils in thickness.

The preferred carcass layer 2 is formed by bonding the several layers together preferably with a suitable adhesive 5. One method of forming the carcass layer 2 is to coat the inner surfaces of the fabric layers 3 and 4 with an adhesive 5 and allow the adhesive 5 to bond the layers, 3 and 4, together. Preferably, an amount of pressure sufficient to ensure overall bonding should be used. More preferably, when one wishes to minimize the overall thickness of the carcass, additional pressure, such as can be obtained from a rotocure or a high pressure lamination press, may be used.

The compressible layer 7 is attached to the outer surface of the fabric layer 4, preferably by an adhesive layer 6. This layer 7 may either be foamed or unfoamed, though a foamed layer is preferred. The layer 7 may be formed of any elastomeric material which has good integrity and resilience. The layer should be from about 5 mils to about 30 mils in thickness, preferably 15 to 20 mils and if foamed, should have a void volume of at least 20%, preferably at least 30%.

Suitable elastomeric materials include natural rubber, synthetic rubbers, such as nitrile, polyisoprene, polybutadiene, butyl rubber, styrene-butadiene copolymers and ethylene-propylene copolymers, polyacrylic polymers, polyurethanes, epichlorohydrins, chlorosulfonated polyethylenes, silicone rubbers or fluorosilicone rubbers.

Additional ingredients commonly added to rubber compositions such as fillers, stabilizers, pigments, bonding agents, plasticizers, crosslinking or vulcanizing agents and blowing agents may be used in this layer.

The preferred compressible layer 7 is formed of a closed cell foam of nitrile rubber. Such a layer and a method of making it is taught in U.S. Pat. No. 4,303,721 which is incorporated herein by reference.

The compressible layer 7 is attached to the carcass layer 2 by various means including an adhesive 6 such as a nitrile rubber adhesive or by direct bonding and crosslinking of the compressible layer 7 to the upper surface of the outer layer 4 of the carcass layer 2.

In order to provide a resilient, compressible printing blanket having good web feed properties, the blanket must exhibit minimum circumferential or lateral movement of the printing surface layer 9 relative to the stabilizing carcass 2. The thermoplastic reinforced elastomer stabilizing layer 8 of the present invention provides the desired stability. To do so, it has been found that the layer must have a tensile modulus of greater than 1000 psi at 25% elongation and an elongation at break of greater than 50% as determined by ASTM test D412-87. Preferably, the tensile modulus is greater than 1200 psi at 25% elongation and the elongation at break is greater than 100%.

The term "thermoplastic reinforced elastomer" as used herein, includes a composition comprised of an elastomer with the usual processing, stabilizing, and strengthening additives plus a thermoplastic polymer. Elastomers that may be used in the present invention are any suitable polymeric materials which are considered curable or vulcanizable. Examples of such materials include natural rubbers, fluoroelastomers, SBRs (styrene butadiene rubber), EPDM (ethylene-propylene non-conjugated diene terpolymers), butyl rubbers, neoprenes, nitrile rubbers such as NBRs (nitrile butadiene rubber), polyurethanes, epichlorohydrins, chloroprenes, etc. An elastomer which is resistant to hydrocarbon solvents is preferred.

The thermoplastic reinforcing polymer should be in the form of a fiber, preferably in the form of a fibril (i.e., a branched fiber). The selected polymer or polymers should have a high tensile modulus (also called modulus of elasticity as determined by ASTM test D638) preferably having a value of at least 75,000 psi. Thermoplastic polymers that may be used in the present invention include polyvinyl chloride, vinyl chloride copolymers, polyamides, aromatic polyamides, polyesters, polyolefins, vinylidene chloride and other fiber or fibril forming thermoplastic resins. The weight ratio of elastomer to thermoplastic polymer may be from 90:10 to 10:90, with the more preferred range being 75:25 to 25:75 and the most preferred range being 60:40 to 40:60.

The thermoplastic polymer may be mixed with the elastomer using processes well known to those skilled in the art. Typical processes include mill mixing, Banbury mixing, extrusion, etc. If the thermoplastic polymer is initially in a granular or fibrous form, then the mixing temperature should exceed the melting point of the thermoplastic polymer to insure proper dispersion within the elastomer. It is believed that under these conditions, the thermoplastic material is dispersed in the elastomer in a fibrillar or microfibrillar form due to shear forces applied to the molten thermoplastic polymer during mixing.

The thermoplastic material may also be introduced into the elastomer after having previously been formed in either a fibrous or fibrillar form such as is available as "synthetic pulp". This can be done using some of the same processes as mentioned earlier but in this instance, it is not necessary to have the mixing temperature exceed the melting point of the thermoplastic polymer. It may also be introduced into the elastomer if the elastomer has been predissolved in a suitable solvent. Proper dispersion can be achieved by suitable mixing techniques which are well known to those skilled in the art.

Another preferred method of introducing the thermoplastic polymer into the elastomer is to melt the thermoplastic polymer in a suitable applicator such as a hot melt applicator or extruder and then introduce the molten thermoplastic into the elastomer in a fine thread-like form while mixing the elastomer so as to create a fibrilated network of thermoplastic throughout the elastomer. If desired, the elastomer may be softened or predissolved in a suitable solvent to allow for easier mixing of the components.

Regardless of the method by which the thermoplastic polymer and elastomer are mixed, the resultant layer is coated or otherwise formed on the surface of the compressible layer and bonded thereto, for example, by vulcanization or a suitable adhesive. The layer should be from about 1 to 20 mils thick, preferably from about 5 to about 10 mils thick.

A printing surface layer 9 is attached to the upper surface of the thermoplastic reinforced elastomer layer 8. The layer 9 may be formed of any of the materials described for use in the compressible layer 6 or the elastomeric component of the thermoplastic reinforced elastomeric layer 8 but should not be foamed and preferably is void free. The layer should be from about 1 mil to about 15 mils in thickness, preferably about 5 to 10 mils in thickness and have a durometer of from about 40 to about 70 SHORE A hardness.

The overall thickness of the blanket shown in FIG. 1 should be similar to that of a conventional blanket, namely from about 50 to about 100 mils.

EXAMPLE

A resilient compressible printing blanket was prepared as generally outlined in U.S. Pat. No. 4,303,721 except that the following thermoplastic reinforced elastomer was used in place of the hard rubber layer disclosed in subject patent. The thermoplastic reinforced elastomer was prepared by Banbury mixing the following ingredients:

| Ingredients | Parts |
|---|---|
| Butadiene-acrylonitrile rubber (Krynac 826E, Polysar Limited) | 8.3 |
| Butadiene-acrylonitrile copolymer flux blended with polyvinyl chloride (50% of each component) (Krynac 850, Polysar Limited) | 91.7 |
| Carbon Black N-330 | 54.2 |
| Aromatic Hydrocarbon Resin (Nevex 100, Neville Chemical) | 54.2 |
| Antioxidant | 2.0 |

-continued

| Ingredients | Parts |
|---|---|
| (Agerite Superflex, R.T. Vanderbilt) | |
| Zinc oxide | 5.0 |
| Stearic acid | 1.0 |
| Spider Brand Sulfur (C.P. Hall) | 1.0 |
| | 217.4 |

The above compound was dissolved in a mixture of toluene plus a cosolvent containing the following curing agents.

| Ingredients | Parts |
|---|---|
| Sulfur | 0.39 |
| Tetramethylthiuram disulfide (Methyl Tuads, R.T. Vanderbilt) | 1.76 |
| 4,4'-Dithiodimorpholine (Sulfasan R, Harwick Chemical) | 1.76 |
| Benzothiazyl disulfide (Altax, R.T. Vanderbilt) | 1.30 |
| Di(butoxy-ethoxy-ethyl) formal (TP-90B, Morton Thiokol) | 1.8 |

The compound was then knife coated on top of the ground foam rubber compressible layer attached to a carcass comprised of two layers of woven cotton fabric bonded together by a nitrile based adhesive. A 5 mil thick layer of thermoplastic reinforced elastomer was coated onto the ground foam surface in multiple passes with the solvent being removed before each subsequent coating pass.

A 5 mil thick layer of surface rubber was then knife coated over the thermoplastic reinforced elastomer layer to provide an ink receptive transfer layer. The surface rubber and thermoplastic reinforced elastomer layer were simultaneously vulcanized by heating at a minimum of 270° F. for at least 60 minutes.

The physical properties of the thermoplastic reinforced elastomer are compared to those of the compound listed in U.S. Pat. No. 4,303,721 in the following table:

TABLE I

| | Example From U.S. Pat. No. 4,303,731 | Present Invention |
|---|---|---|
| Tensile Strength (psi) at | | |
| 25% elongation | 549 | 1460 |
| 10% elongation | 728 | 1810 |
| Ultimate Elongation (%) | 385 | 149 |
| Shore A Durometer | 90 | 98 |
| Resiliency (%) | 12 | 44 |

Blankets prepared with the thermoplastic reinforced elastomer layer were mounted on a four-color Harris M300 press and were found to print satisfactorily and to transport more web through the printing nip as evidenced by lower web tensions in the process and little register movement when paper splices went through the press. These blankets also showed improved packing latitude as evidenced by the fact that increasing the packing height by an additional three thousandths of an inch over bearer height had no adverse effect on web feed properties and again showed little register movement when paper splices passed through the printing nips.

As can be appreciated from the results above, the present invention provides a significant advantage to the printing art in overcoming the problems encountered with the available printing blankets, namely print sharpness, falloff at the gap, register control and sensitivity to packing height. The present invention combines the desired characteristics of the current printing blankets without their existing drawbacks.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

We claim:

1. A resilient compressible printing blanket comprising:

(a) a base layer formed of a low machine direction, elongation stabilizing material;

(b) a compressible layer over the base layer, the compressible layer being comprised of foamed rubber;

(c) a stabilizing layer formed of a thermoplastic reinforced elastomer bonded to an upper surface of the compressible layer; and, (d) a printing surface layer formed on top of the stabilizing layer.

2. The printing blanket of claim 1 wherein the base layer is a carcass formed of one or more layers of woven cloth having low machine direction elongation characteristics; the compressible layer is formed of an essentially closed celled structure; the thermoplastic reinforced elastomer is formed from one or more elastomeric polymers and one or more thermoplastic polymer resins; and the printing surface layer is formed of an unfoamed, substantially void free elastomeric polymer.

3. The printing blanket of claim 1 wherein the elastomer component of the thermoplastic reinforced elastomer is selected from the group consisting of natural rubber, fluoroelastomers, styrene butadiene copolymers, ethylene-propylene diene polymers, butyl rubbers, neoprenes, nitrile rubbers, polyurethanes, epichlorohydrins, chloroprenes and mixtures thereof; and the thermoplastic reinforcing component of the thermoplastic reinforced elastomer is selected from the group consisting of vinyl chloride polymers and copolymers, polyamides, aromatic polyamides, polyesters, polyolefins and mixtures thereof.

4. The printing blanket of claim 1 wherein the stabilizing layer has a tensile strength of greater than 1000 psi at 25% elongation and an elongation at break of greater than 50%.

5. The printing blanket of claim 1 wherein the thermoplastic component of the stabilizing layer is in a form selected from the group consisting of fibers, fibrils, microfibrils and mixtures thereof.

6. The printing blanket of claim 1 wherein the thermoplastic reinforced elastomer of the stabilizing layer is formed by evenly mixing a molten thermoplastic into the elastomer.

7. The printing blanket of claim 1 wherein the stabilizing layer has a tensile strength of at least 1200 psi at 25% elongation and an elongation at break of greater than 100%.

8. A lithographic printing blanket comprising a carcass formed of one or more layers of woven cloth having low machine direction elongation characteristics, a resilient, compressible, foamed rubber layer laid over the carcass layer and bonded thereto, a stabilizing layer of thermoplastic reinforced elastomer overlaying the compressible layer and a void free rubber printing surface layer overlaying the stabilizing layer.

9. The lithographic printing blanket of claim 8 wherein the stabilizing layer of thermoplastic reinforced elastomer is formed by distributing a thermoplastic polymer evenly through the elastomer and wherein the thermoplastic is in the form of a fibril or microfibril.

10. The lithographic printing blanket of claim 8 wherein the stabilizing layer has a tensile strength of greater than 1000 psi at 25% elongation and an elongation at break of greater than 50%.

11. The lithographic printing blanket of claim 9 wherein the weight ratio of elastomer to thermoplastic polymer is from about 10% to about 90%.

12. The lithographic printing blanket of claim 11 wherein the weight ratio of elastomer to thermoplastic polymer is about 25% to about 75%.

13. The lithographic printing blanket of claim 11 wherein the weight ratio of elastomer to thermoplastic polymer comprises from about 40% to about 60% of the thermoplastic reinforced elastomer.

* * * * *

REEXAMINATION CERTIFICATE (1229th)

United States Patent [19]

[11] B1 4,812,357

O'Rell et al.

[45] Certificate Issued Mar. 27, 1990

[54] PRINTING BASKET

[75] Inventors: Dennis D. O'Rell, Boxborough; Peter M. Holleran, Concord, both of Mass.

[73] Assignee: W.R. Grace & Co.

Reexamination Request:
No. 90/001,766, May 1, 1989

Reexamination Certificate for:

| | |
|---|---|
| Patent No.: | **4,812,357** |
| Issued: | **Mar. 14, 1989** |
| Appl. No.: | **248,460** |
| Filed: | **Sep. 23, 1988** |

[51] Int. Cl.[4] .......................... B41N 9/00; B32B 3/26; B32B 7/02; B32B 7/04

[52] U.S. Cl. .................................... 428/246; 428/250; 428/283; 428/304.4; 428/319.3; 428/909

[58] Field of Search ............ 428/246, 250, 283, 304.4, 428/319.3, 909, 319.7

[56] References Cited

FOREIGN PATENT DOCUMENTS 1327757 8/1973 United Kingdom ................ 428/909
1327758 8/1973 United Kingdom ................ 428/909

*Primary Examiner*—William J. Van Balen

[57] ABSTRACT

A printing blanket having excellent dimensional stability, compressibility and web feed properties comprising a carcass, a compressible layer overlaying the carcass, a stabilizing layer of thermoplastic reinforced elastomer overlying the compressible layer and a printing surface layer of void free rubber. The thermoplastic reinforced elastomer is formed of fibers or fibriles of thermoplastic dispersed throughout the elastomer. Preferably the thermoplastic is molten when mixed with the elastomer in order to provide very fine, well dispersed fibriles.

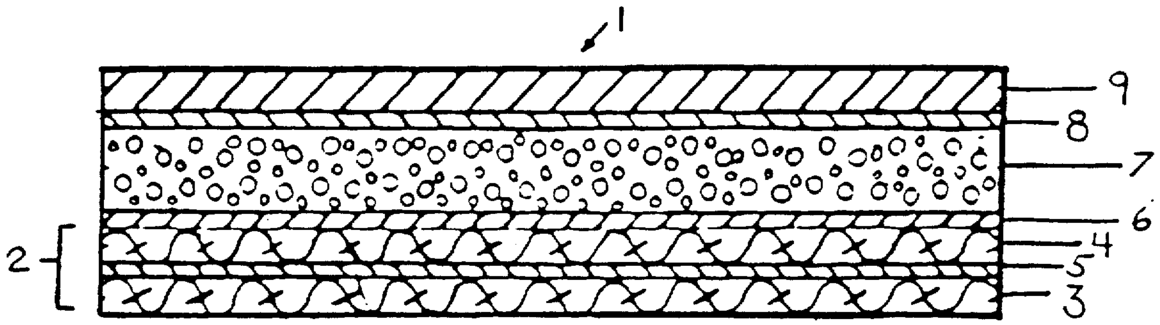

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 8 are determined to be patentable as amended.

Claims 2-7 and 9-13, dependent on an amended claim, are determined to be patentable.

1. A resilient compressible printing blanket comprising:

(a) a base layer formed of a low machine direction, elongation stabilizing material;

(b) a compressible layer over the base layer, the compressible layer being comprised of foamed rubber;

(c) a stabilizing layer formed of a *fibrous* thermoplastic reinforced elastomer bonded to an upper surfaceof the compressible layer; and, (d) a printing surface layer formed on top of the stabilizing layer.

8. A lithographic printing blanket comprising a carcass formed of one or more layers of woven cloth having low machine direction elongation characteristics, a resilient, compressible, foamed rubber layer laid over the carcass layer and bonded thereto, a stabilizing layer of *fibrous* thermoplastic reinforced elastomer overlying the compressible layer and a void free rubber printing surface layer overlaying the stabilizing layer.

* * * * *